United States Patent [19]
Brecheisen et al.

[11] Patent Number: 5,988,460
[45] Date of Patent: Nov. 23, 1999

[54] MOLDED PLASTIC CONTAINER AND CONTAINER PACKAGE WITH INTEGRAL POUR SPOUT

[75] Inventors: William W. Brecheisen, Findlay; James L. Gregory; Igor F. Beaufils, both of Toledo, all of Ohio

[73] Assignee: Owens-Brockway Plastic Products Inc., Toledo, Ohio

[21] Appl. No.: 09/049,913

[22] Filed: Mar. 30, 1998

[51] Int. Cl.[6] .................................................. B65D 5/72
[52] U.S. Cl. ............................................................ 222/572
[58] Field of Search ................................... 222/215, 462, 222/562, 572

[56] References Cited

U.S. PATENT DOCUMENTS

| | | | |
|---|---|---|---|
| 678,400 | 7/1901 | Hoeg | 222/562 |
| 2,663,463 | 12/1953 | Benbury et al. | 222/215 |
| 4,640,855 | 2/1987 | St. Clair | 222/572 |
| 5,207,356 | 5/1993 | Krall | 222/572 |
| 5,226,574 | 7/1993 | Durinzi, Jr. | 222/572 |
| 5,645,870 | 7/1997 | Larsen | 425/182 |

*Primary Examiner*—Philippe Derakshani

[57] ABSTRACT

A plastic container that includes a hollow container body having a body opening, a cylindrical finish wall portion surrounding the body opening and extending from the body, with external threads for receiving a closure, and a spout secured to and projecting axially from the externally threaded wall portion. The body, wall portion and spout are of as-molded one-piece or monolithic integral plastic construction. The axial dimension of the spout preferably is greater than that of the externally threaded wall portion of the container finish. The threaded wall portion or the spout has an axially oriented surface that lies in a plane perpendicular to the axis of the container finish for sealing engagement with a closure or cap that is threaded onto the container finish.

16 Claims, 2 Drawing Sheets

MOLDED PLASTIC CONTAINER AND CONTAINER PACKAGE WITH INTEGRAL POUR SPOUT

The present invention is directed to molded plastic container packages, and more particularly to a container and method of construction having an integral pour spout.

BACKGROUND AND SUMMARY OF THE INVENTION

Containers constructed of a blow-molded container body with integral finish are conventional in the art. One such container is generally rectangular, and is marketed for dispensing engine oil. The container finish is offset from the centerline of the container at one edge of the top. When the closure or cap is removed from the container, the container is tipped to pour the contents into an engine opening. The recommended method of pouring the contents is with the container finish positioned remote from the engine opening, and then tipped into the opening. However, in use, consumers often position the container finish adjacent to the engine opening before tipping, which often leads to spillage.

It has also been proposed in other applications to provide a pour spout on a container finish by forming the spout in a separate operation and then securing the spout to the container finish in a suitable joining operation. It is a general object of the present invention to provide a container having a finish and pour spout of integral or one-piece construction as molded. Another object of the present invention is to provide a method of constructing such an integral plastic container having a sealing surface on the pour spout or the threaded finish for sealing engagement with a closure. A further object of the present invention is to provide a container and closure package that embodies a container of the described character.

In accordance with one aspect of the present invention, there is provided a method of making a plastic container that includes integrally molding a container body having an opening, an externally threaded cylindrical finish portion extending from the body surrounding the opening, and a spout extending from an end of the threaded portion remote from the container body. The container body, threaded finish and spout preferably are integrally molded in a single blow-molding operation. The spout in the preferred embodiments extends from the container-remote end of the threaded portion of the finish, which is to say that the spout forms an integrally molded axial extension of the threaded portion of the finish. The spout is preferably coaxial with the threaded cylindrical portion of the container finish, and is of either cylindrical construction or conical construction narrowing away from the container body. In the preferred method of the invention, an area of the spout or the threaded cylindrical portion of the container finish is machined following the blow-molding operation to provide an axially oriented surface, either at the free end of the spout or at the upper edge of the threaded portion of the container finish surrounding the spout, for sealing engagement with a closure threaded onto the container finish.

In accordance with another aspect of the present invention, there is provided a plastic container that includes a hollow container body having a body opening, a cylindrical finish wall portion surrounding the body opening and extending from the body, with external threads for receiving a closure, and a spout projecting axially from the externally threaded wall portion forming a continuation or extension of the threaded wall portion. The body, wall portion and spout are of integrally molded plastic construction, which is to say that the body, finish and spout are of as-molded one-piece integral construction, as distinguished from being molded or formed as multiple pieces that are joined together. The axial dimension of the spout preferably is greater than that of the externally threaded wall portion of the container finish. The threaded wall portion or the spout has an axially oriented surface that lies in a plane perpendicular to the axis of the container finish for sealing engagement with a closure that is threaded onto the container finish. The container body is of generally rectangular geometry, with the finish and spout being positioned at an edge of one end.

In accordance with a third aspect of the present invention, there is provided a container and closure package that includes an as-molded integral container body, finish and spout as previously described, and a closure having internal threads axially received over the external threads on the container finish in sealing engagement with the spout or the threaded wall portion of the container finish.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
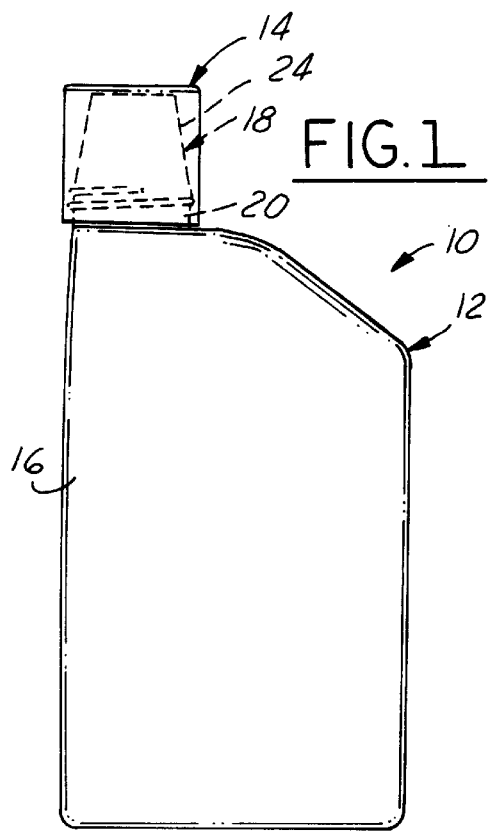
FIG. 1 is a side elevational view of a container and closure package in accordance with one presently preferred embodiment of the invention.
Figure 2:
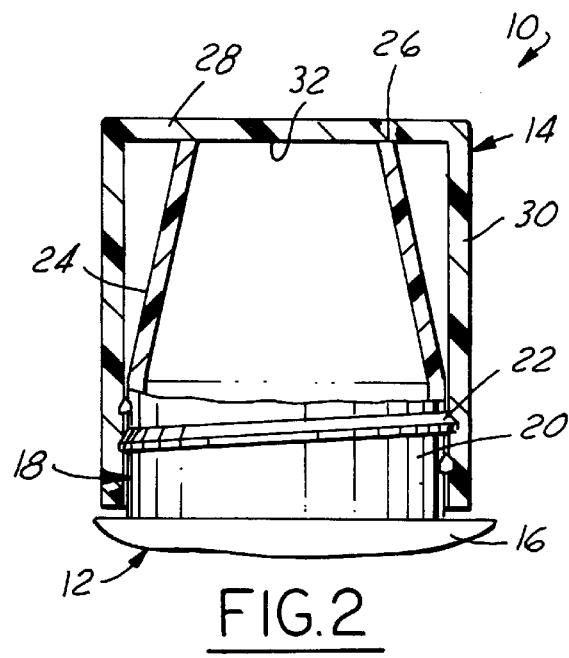
FIG. 2 is a fragmentary sectional view of the container finish and closure in the package of FIG. 1.
Figure 3:
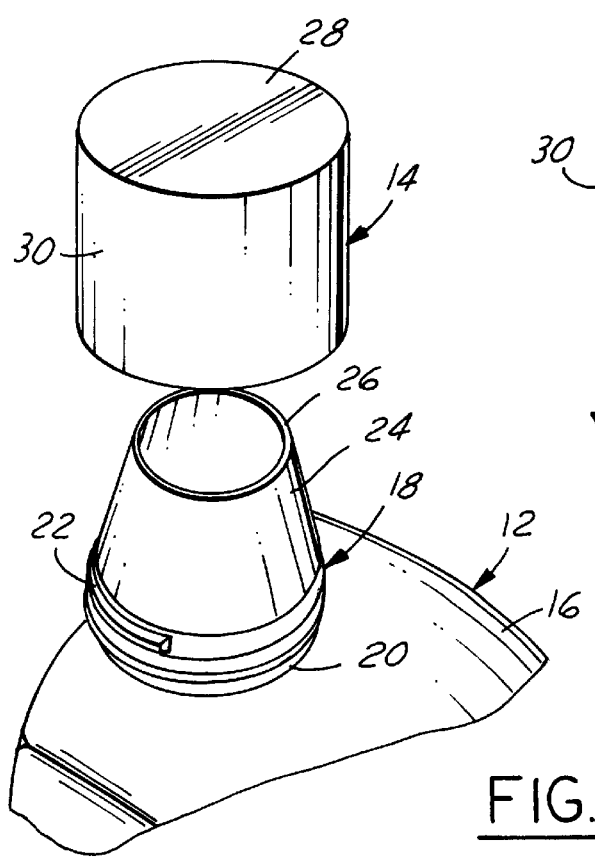
FIG. 3 is a fragmentary exploded perspective view of the container finish and closure in the embodiment of FIGS. 1 and 2.

FIGS. 1–3 illustrate a plastic container and closure package 10 in accordance with one presently preferred embodiment of the invention as comprising an integrally molded plastic container 12 and a molded plastic closure 14. (As noted above, the terms "integral" and "integrally" are employed in this application as meaning a one-piece or monolithic construction as molded—i.e., molded as a single piece—as distinguished from a construction of multiple pieces that are joined to each other by welding, overmolding or other joining techniques.) Container 12 includes a hollow rectangular body 16 having an opening 17 (FIG. 6) at one edge of the upper end surrounded by a container finish 18. Finish 18 in the preferred embodiment of the invention includes a cylindrical portion 20 coaxially surrounding the opening in the container body and having external threads 22 for receiving closure 14. A pour spout 24 integrally extends from cylindrical finish wall portion 20 coaxially with wall portion 20. The axial dimension of spout 24 preferably is greater than that of externally threaded wall portion 20, being almost twice the axial dimension of wall portion 20 in the embodiment of FIGS. 1–3. Spout 24 in the embodiment of FIGS. 1–3 is of conical geometry, tapering narrowingly away from container body 16 to terminate in an axially oriented sealing surface 26 that lies in a plane perpendicular to the axis of spout 24 and finish wall portion 20. Closure 14 comprises an open cup-shaped shell having a flat base 28 and a cylindrical skirt 30 with internal threads for threaded receipt over external threads 22 on finish wall portion 20. The underside 32 of closure base 28 is in sealing engagement in assembly with sealing surface 26 of spout 24. By way of example, finish portion 20 may be of 38 mm outside diameter, while spout 24 may narrow to an outside diameter of 28 mm.

Figure 4:
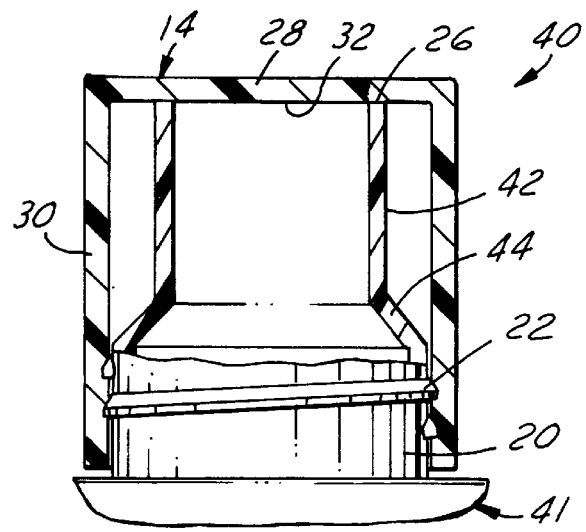
FIG. 4 is a fragmentary sectional view similar to that of FIG. 2 but showing a second embodiment of the invention.
Figure 5:
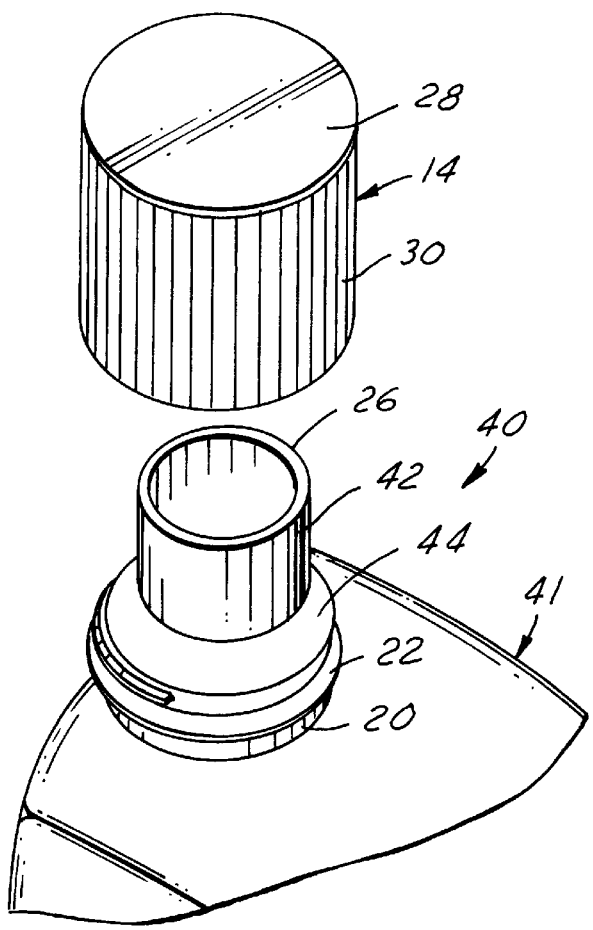
FIG. 5 is a fragmentary exploded perspective view similar to that of FIG. 3 but showing the embodiment of the invention illustrated in FIG. 4.

FIGS. 4–5 illustrate a modified container and closure package 40 in accordance with the present invention, in which reference numerals identical to those employed in connection with FIGS. 1–3 indicate identical parts or components. Spout 42 in FIGS. 4–5 is of cylindrical construction over a major portion of its length at a diameter less than that of finish portion 20, and is joined to the upper edge of finish wall portion 20 by a conical spout portion 44. Cylindrical spout 42, spout portion 44 and finish wall portion 20 are coaxial with each other. Externally threaded finish wall portion 20 may again be of 38 mm diameter, while the diameter of spout 42 at sealing surface 26 may be 28 mm. The axial dimension of spout 42 and spout portion 44 is again greater than that of finish wall portion 20, being greater than twice the dimension of finish wall portion 20 in this embodiment.

Figure 6:
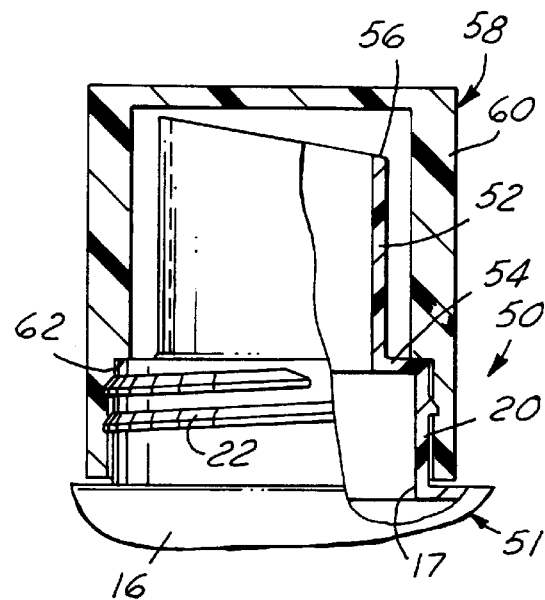
FIG. 6 is a fragmentary sectional view similar to those of FIGS. 2 and 4 but illustrating a third embodiment of the invention.
Figure 7:
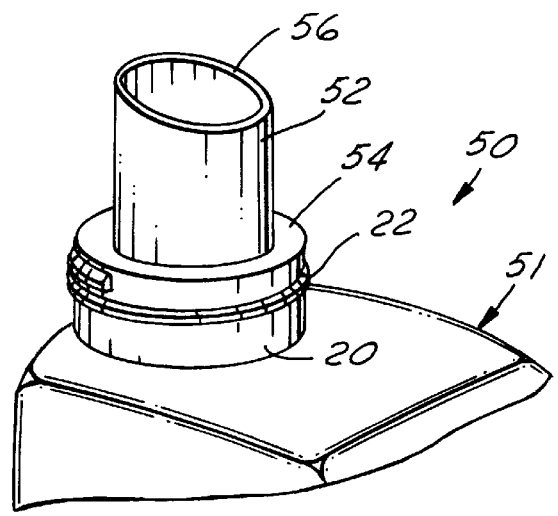
FIG. 7 is a fragmentary perspective view of the container and furnish in the embodiment of FIG. 6.

FIGS. 6–7 illustrate another modified package 50, in which components identical to those in FIGS. 1–5 are again indicated by correspondingly identical reference numerals. In this embodiment, the spout 52 is of cylindrical geometry coaxial with externally threaded portion 20 of the container finish, and is joined to the upper edge of portion 20 by a flat ledge 54. Ledge 54 has an upper sealing surface that lies in a plane perpendicular to the axis of finish portion 20 and spout 52. The upper edge 56 of spout 52 lies in a plane that is disposed at an angle with respect to the axis of the spout and finish portion 20. Thus, edge 56 is not suitable for providing sealing surface engagement with internally threaded closure 58. Rather, closure 58 includes a thickened skirt 60 that defines an axially facing ledge or shoulder 62 in a plane perpendicular to the axis of closure 58, for sealing abutment engagement with ledge 54 on the container finish.

Container 12 in FIGS. 1–3, container 41 in FIGS. 4–5 and container 51 in FIGS. 6–7 are of as-molded one-piece or monolithic integral plastic construction as discussed above. That is, the container body and container finish, including both the externally threaded finish portion and the finish spout, are of one-piece or monolithic construction as molded, as distinguished from being formed of two or more separate pieces that are joined together by welding, overmolding or other suitable joining techniques. It is currently preferred to fabricate the container employing an extrusion-blow molding technique on an otherwise conventional wheel machine of the type disclosed in U.S. Pat. Nos. 4,523,904, 4,549,865, 4,648,831 and 5,645,870. It is also contemplated that the container may be fabricated in an otherwise conventional injection-blow molding operation as described, for example, in U.S. Pat. Nos. 2,710,987 and 2,911,673. The container may also be fabricated in a so-called shuttle machine process of the type disclosed in U.S. Pat. Nos. 3,767,747, 3,781,395, 3,978,184, 4,070,428 and 4,118,452, in which case it may not be necessary to machine the container finish after to molding. The disclosures of all of the noted patents are incorporated herein by reference for purposes of background.

Following the molding operation, the finish portion of the container is machined or otherwise finished as required. For example, the mold moil and flash are conventionally removed in a deflashing stage, and cutting and/or facing operations are performed on the sealing surface 26 (FIGS. 2–5) or 54 (FIGS. 6–7) as required. In this connection, it is noted that there is no need to face upper edge 56 of spout 52 in FIGS. 6 and 7 because this edge does not perform a sealing operation in connection with the container closure. Any suitable technique may be employed to form a seal between closure 14 and the container spout or finish. For example, the embodiments of FIGS. 1–3 and 4–5 may employ a plug-type seal between a lip on undersuface 32 of closure 14 and the radially inner edge of surface 26. Alternatively, a sealing liner may be disposed on closure undersurface 32, although this is less preferred for reasons of cost. The embodiment of FIGS. 6–7 may employ a valve-type seal between shoulder 62 and ledge 54. The closures 14, 58 may be manufactured in any suitable compression or injection molding operation. The closure and the integral container body may be of any suitable compositions.

The containers with integral spout in accordance with the present invention provide improved control in dispensing products, such as oil-type products that must be poured into an engine. The spout allows for a smoother pour, and it allows the consumer to tilt the container into an engine orifice without spilling the package contents onto the engine. The spout also allows the consumer better access to the engine because of its added length in comparison to the finishes on standard containers. The spout allows the consumer to dispense the package into an engine "hands free" after placing the bottle into an engine opening.

We claim:

1. A method of making a one-piece plastic container that comprises the steps of:

(a) integrally molding a container body having an opening, an externally threaded cylindrical portion extending from said body surrounding said opening, and a spout extending from an end of said threaded portion remote from said body and, (b) machining an axially oriented surface area of said spout or said cylindrical portion by performing cutting and/or facing operations on said spout or said cylindrical portion to form said surface area into a sealing surface adapted for sealing engagement with a closure threadably received on said threaded cylindrical portion.

2. The method set forth in claim 1 wherein said step (a) of integrally molding said container body, said externally threaded cylindrical portion and said spout is carried out in an extrusion blow-molding operation.

3. The method set forth in claim 1 wherein said spout is coaxial with said cylindrical portion.

4. The method set forth in claim 3 wherein said spout is of cylindrical construction, or is of conical construction narrowing away from said container body.

5. The method set forth in claim 1 wherein said step (b) comprises the step of machining an axially facing free end of said spout on a plane perpendicular to said spout.

6. The method set forth in claim 1 wherein said step (b) comprises the step of machining an axially facing surface on said cylindrical portion surrounding said spout.

7. A one-piece plastic container that comprises:

a hollow container body having a body opening, a cylindrical wall portion surrounding said opening and extending from said body, said wall portion having external threads for receiving a closure, and a spout secured to and projecting axially from an end of said wall portion remote from said body, said body, said wall portion and said spout being of as-formed one-piece integral plastic composition, wherein said spout has an axial dimension that is greater than that of said wall portion, wherein said spout is coaxial with said cylindrical wall portion, and wherein an axially oriented sealing surface is provided on said spout or said wall portion machined by cutting and/or facing operations on said spout or said wall portion to form said axially oriented sealing surface so as to be adapted for sealing engagement with a closure threadably received on said wall portion external threads.

8. The container set forth in claim 7 wherein said spout is coaxial with said cylindrical wall portion.

9. The container set forth in claim 7 wherein said spout is of cylindrical construction, or is of conical construction narrowing away from said container body.

10. The container set forth in claim 7 wherein said axially oriented surface is at a free end of said spout.

11. The container set forth in claim 10 wherein said axially oriented surface is at an end of said wall portion surrounding said spout.

12. The container set forth in claim 11 wherein said spout has a free end that is axially angulated.

13. A closure package that comprises the container set forth in claim 7 in combination with a closure having internal threads threadably received over said external threads and having an axially oriented surface in sealing engagement with said machined sealing surface of said spout or said wall portion.

14. The package set forth in claim 13 wherein said axially oriented surface is at a free end of said spout.

15. The package set forth in claim 13 wherein said axially oriented surface is at an end of said wall portion surrounding said spout.

16. The package set forth in claim 15 wherein said spout has a free end that is axially angulated.

* * * * *